Oct. 20, 1953 J. D. SPALDING 2,655,706
PIPE SLIP GRIPPING INSERT
Filed Oct. 4, 1948 2 Sheets-Sheet 1

JOHN D. SPALDING,
INVENTOR.

BY Lyon & Lyon
ATTORNEYS

JOHN D. SPALDING,
INVENTOR.

BY Lyon & Lyon
ATTORNEYS

Patented Oct. 20, 1953

2,655,706

UNITED STATES PATENT OFFICE 2,655,706

PIPE SLIP GRIPPING INSERT

John D. Spalding, Los Angeles, Calif., assignor to The National Supply Company, Pittsburgh, Pa., a corporation of Pennsylvania Application October 4, 1948, Serial No. 52,733

3 Claims. (Cl. 24—263)

1

This invention relates to pipe gripping apparatus and is particularly directed to improvements in slips employed in well drilling machinery. Slips of this type are used in connection with rotary machines, elevators, casing and tubing spiders and the like.

It is a primary object of my invention to provide an improved form of slip having extremely hard metal inserts for engaging the outside surface of an elongated work member or the wall of a pipe.

Another object is to provide a novel form of slip having tungsten carbide inserts forming wicker teeth for engaging the pipe. In using the term tungsten carbide I have reference to any of the cemented carbide combinations or other structural material suitable for such service.

Another object is to provide an improved form of mounting for such inserts on the slip segments.

Another object is to provide segmental slips for handling pipe in which hard metal inserts are provided with edges which project only a relatively short distance beyond the inner wall of the slip segments, the pipe being contacted circumferentially by the relatively smooth bore of the slip segments after the inserts bite into the pipe surface. By reason of this mounting the insert need project beyond the inner bore of the slip segment only for a sufficient distance to engage the pipe and thus energize the slip segments into wedging position.

A further object is to provide a novel form of mounting for the hard metal inserts so that they are retained in place on the segments without the use of any supplementary fastener elements, and so that the load applied by the pipe on the inserts acts in a direction to increase the rigidity of mounting of the inserts on the segments.

Other objects and advantages will appear hereinafter.

2

Figure 1:
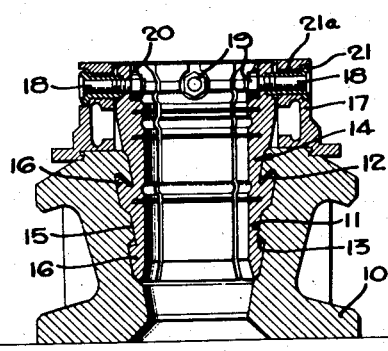
Figure 1 is a sectional elevation of a pipe gripping spider of the type used in well drilling operations and showing slip segments embodying my invention.
Figure 2:
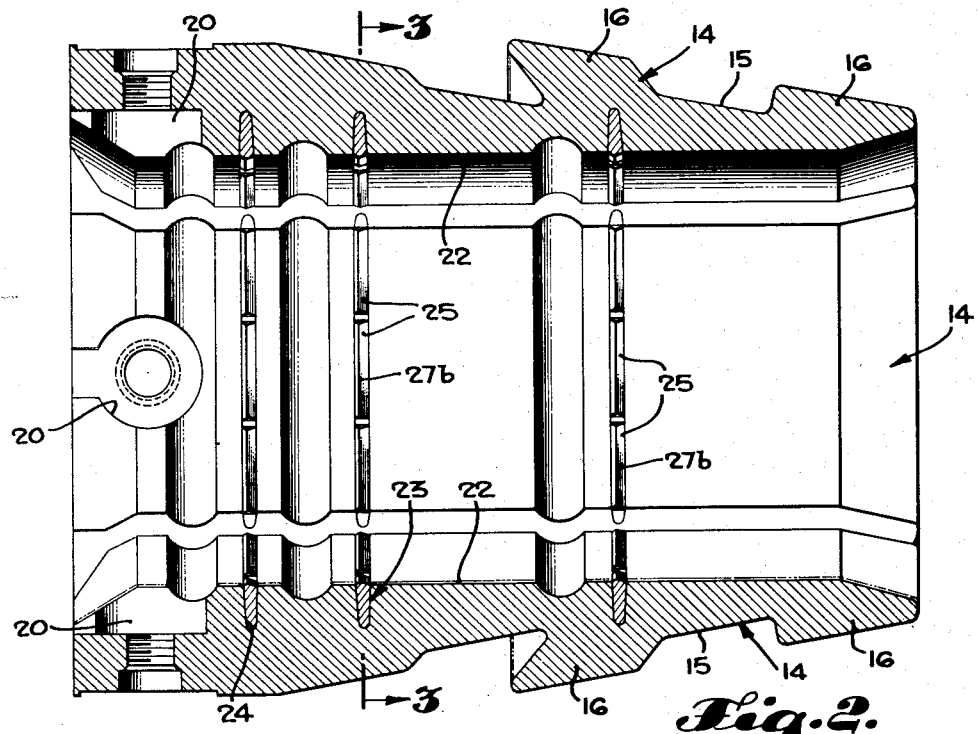
Figure 2 is a vertical sectional elevation of the slip segments shown on an enlarged scale.
Figure 3:
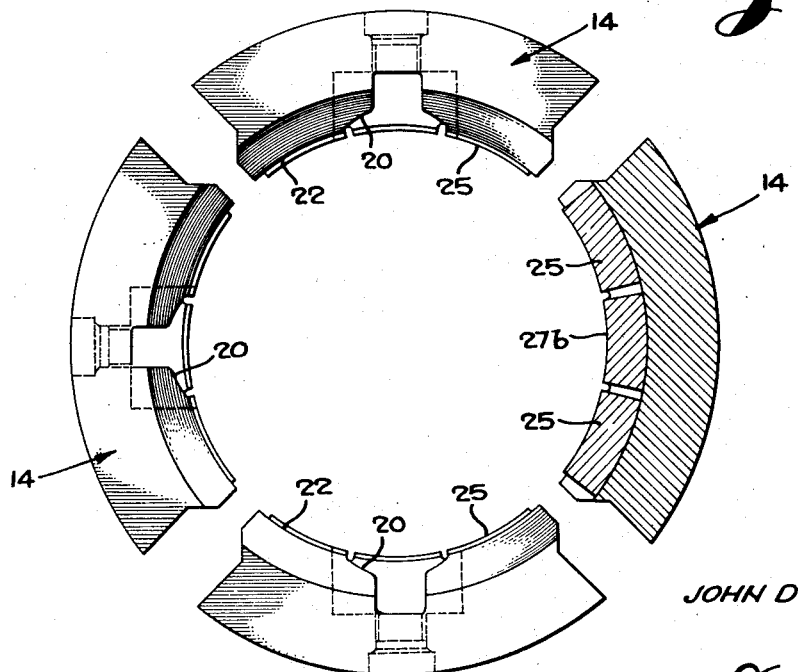
Figure 3 is a horizontal plan view of the slip segments, one of the segments being shown in section taken substantially on the lines 3—3 as shown in Figure 2.

Referring to the drawings, the automatic grip casing spider shown in Figure 1 has been chosen for illustrating a preferred embodiment of my invention, but it will be understood that my invention is applicable to wedge slips generally, and is not limited to the embodiment shown. The base 10 of the automatic grip spider is provided with a tapered bore 11 interrupted by upper and lower annular recesses 12 and 13. A plurality of slip segments 14 are mounted within the tapered bore 11 and each is provided with conical portions 15 on its back surfaces which are adapted to seat on the tapered bore 11. When the slips are retracted upwardly the annular rings 16 enter the recesses 12 and 13.

The slip segments 14 may be moved manually with respect to the tapered bore 11, or as shown in the drawings, may be actuated by a cam ring 17 turnably mounted on the base 10. A pin 18 fixed on each slip segment by means of a nut 19 positioned within a recess 20 carries a roller 21 which operates within the cam track 21a on the cam ring 17. Rotary movement of the ring 17 therefore is effective to cause movement of the slip segments 14 within the bowl or tapered bore 11.

In their lower operative position, the slip segments 14 are adapted to engage the wall of a pipe, or other work member (not shown), extending vertically through the base 10, and the slip segments support the pipe by wedging action within the bowl 11. The slip segments are bored to provide inner cylindrical surfaces 22 which engage the pipe circumferentially. If desired, the inner surfaces 22 may be provided with the usual wicker teeth for contact with the pipe.

Figure 4:
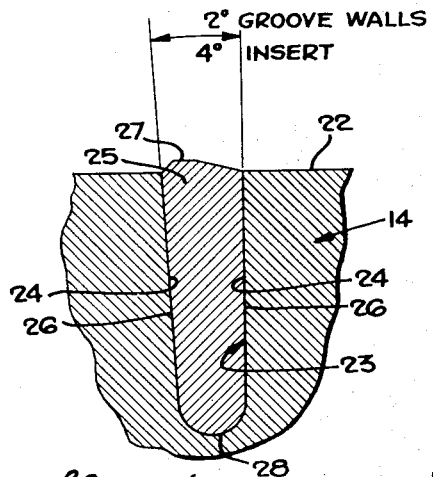
Figure 4 is an enlarged sectional detail showing the mounting of the hard metal insert within the body of one of the slip segments.
Figure 5:
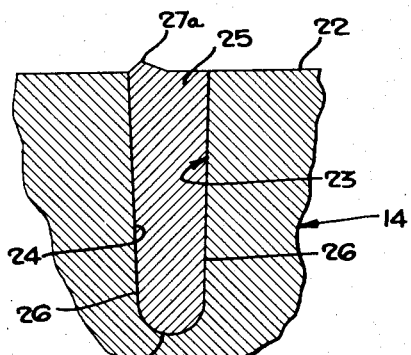
Figures 5 and 6 are similar to Figure 4 and show modified forms of hard metal inserts.
Figure 6:
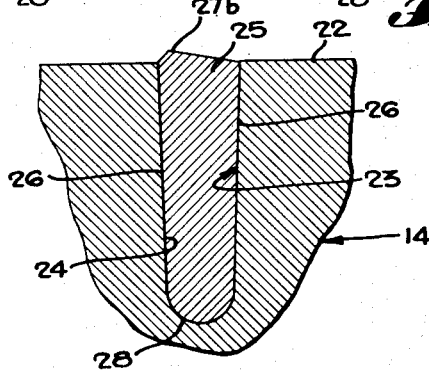

In accordance with my invention, I provide one or more circumferential grooves 23 which extend radially into the slip segments 14 from the inner surface 22. The side walls 24 of each of the grooves 23 preferably are not parallel but converge on a small angle in a radial direction away from the inner surface 22. Hard metal inserts 25 which may be formed of tungsten carbide are fixed in the grooves 23 by press fit. The side faces 26 of the inserts 25 are initially of slightly greater taper than the walls 24 of the grooves 23 so that the squeezing forces confining the inserts between the groove walls are accentuated. Thus, as shown in Figure 4, the initial angle of taper of the side faces of the insert 25 may be about 4° while the initial angle of taper of the side walls 24 of the groove may be only about 2°. Substantially, the entire insert is confined between the groove walls 24 and maintained in that position under compression. Only the pipe engaging lip 27 on the inner edge of the insert 25 projects beyond the surface 22. The shape of the projecting lip 27 may be varied, as shown by the modifications 27a and 27b in Figures 6 and 7, respectively, but in any event the lip extends only a very short distance beyond the surface 22 on the segment 14, so that substantially no bending load is imposed on the insert 25.

The outer edge of each insert 25 is rounded as shown at 28 to conform to the rounded bottom provided for each groove 23. The inserts 25 are assembled into the grooves under relatively large forces applied radially so that the inserts are forced into the grooves for their full depth. The interference fit provides a solid mounting for the inserts which is free from auxiliary holding or clamping elements, and furthermore the load in service as applied to each insert by the pipe only serves to supplement the clamping effect on the insert.

When the slip segments are moved down within the tapered bore or bowl 11, the lips 27 engage the pipe and "bite" into the wall thereof, thereby energizing the slip into wedging position. In such wedging position the surface 22 (or the usual wicker teeth if such are provided) support the pipe by full circle or circumferential contact.

While I have chosen to illustrate my invention in connection with pipe slips having cylindrical faces, it is recognized that slips having flat contact faces or other noncylindrical forms may be used with good results. In such cases the mounting groove or grooves for the hard metal inserts extend transversely of the slip segments, but the hard metal inserts are shaped to conform to the contact surface of the segments, rather than the circumference of the pipe.

It will be understood that the inserts may also be employed on internal slips adapted for gripping the inner wall of a pipe instead of the outer wall as shown.

Having fully described my invention, it is to be understood that I do not wish to be limited to the details herein set forth, but my invention is of the full scope of the appended claims.

I claim:

1. A metallic insert for a slip segment, comprising a circular ring sector formed of tungsten carbide or the like, said insert being tapered in cross-section on a radial plane and being of greater thickness near the inner portion of the sector, the insert having an inner edge provided with a work engaging lip.

2. An arcuate metallic insert for a slip segment, comprising a circular ring sector formed of tungsten carbide or the like, said insert being tapered in cross-section from a relatively great thickness near the inner portion of the sector to a lesser thickness near the outer portion, the insert having an inner edge provided with a work engaging lip.

3. An arcuate metallic insert for a slip segment, comprising a circular ring sector formed of tugnsten carbide or the like, said insert being tapered in cross-section from a relatively thick inner edge to a relatively thin outer edge, the inner edge being provided with a work-engaging lip and the outer edge being rounded.

JOHN D. SPALDING.

References Cited in the file of this patent

UNITED STATES PATENTS

| Number | Name | Date |
|---|---|---|
| 481,656 | Renold | Aug. 30, 1892 |
| 491,872 | Canfield | Feb. 14, 1893 |
| 590,562 | Baker | Sept. 28, 1897 |
| 1,040,540 | Hendricks | Oct. 8, 1912 |
| 1,317,962 | Corbett | Oct. 7, 1919 |
| 2,023,663 | Burns | Dec. 10, 1935 |
| 2,030,499 | Church | Feb. 11, 1936 |
| 2,157,338 | Jackson | May 9, 1939 |

FOREIGN PATENTS

| Number | Country | Date |
|---|---|---|
| 882,945 | France | June 18, 1943 |